United States Patent
Tai et al.

(10) Patent No.: US 6,697,198 B2
(45) Date of Patent: *Feb. 24, 2004

(54) OPTICAL INTERLEAVERS/DEINTERLEAVERS

(75) Inventors: Kuochou Tai, Fremont, CA (US); Kok-Wai Chang, Los Altos, CA (US); Jyehong Chen, Mt. Holly, NJ (US); Hongwei Mao, San Jose, CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/983,281

(22) Filed: Oct. 23, 2001

(65) Prior Publication Data

US 2002/0027711 A1 Mar. 7, 2002

Related U.S. Application Data

(63) Continuation-in-part of application No. 09/626,698, filed on Jul. 27, 2000, which is a continuation-in-part of application No. 09/476,034, filed on Dec. 31, 1999, and a continuation-in-part of application No. 09/517,640, filed on Mar. 3, 2000, now Pat. No. 6,301,046.
(60) Provisional application No. 60/262,375, filed on Jan. 19, 2001.

(51) Int. Cl.⁷ .................................................. G02B 5/30
(52) U.S. Cl. .................. 359/498; 359/115; 359/124; 359/494; 359/495; 359/497; 359/499
(58) Field of Search ................................. 359/494, 124, 359/495, 496, 497, 498, 117, 115, 127, 129, 156, 499; 385/11, 15, 16

(56) References Cited

U.S. PATENT DOCUMENTS

| | | | | |
|---|---|---|---|---|
| 5,033,830 A | * | 7/1991 | Jameson | 350/403 |
| 5,724,165 A | * | 3/1998 | Wu | 359/117 |
| 6,075,647 A | * | 6/2000 | Braun et al. | 359/578 |
| 6,480,331 B1 | * | 11/2002 | Cao | 359/484 |
| 6,519,065 B1 | * | 2/2003 | Colbourne et al. | 359/161 |
| 6,563,641 B2 | * | 5/2003 | Zhao | 359/495 |

* cited by examiner

Primary Examiner—Audrey Chang
Assistant Examiner—Craig Curtis
(74) Attorney, Agent, or Firm—Hall, Priddy, Myers & Vande Sande

(57) ABSTRACT

Interleaver/deinterleaver apparatuses for combining/separating optical channels are described. When operating as a deinterleaver, the interleaver/deinterleaver separates an optical signal (e.g. WDM signal) into subsets of optical signals (e.g. channels). In one embodiment, deinterleaving optical signals separates an optical signal into even and odd International Telecommunications Union (ITU) channels. The interleaver/deinterleavers may include isolator components to route optical signals to and from input/output ports. A variety of reflective elements, e.g. quarter wave mirrors, reflective prisms, etalons, can be used for double passing the signals through a birefringent crystal assembly.

22 Claims, 13 Drawing Sheets

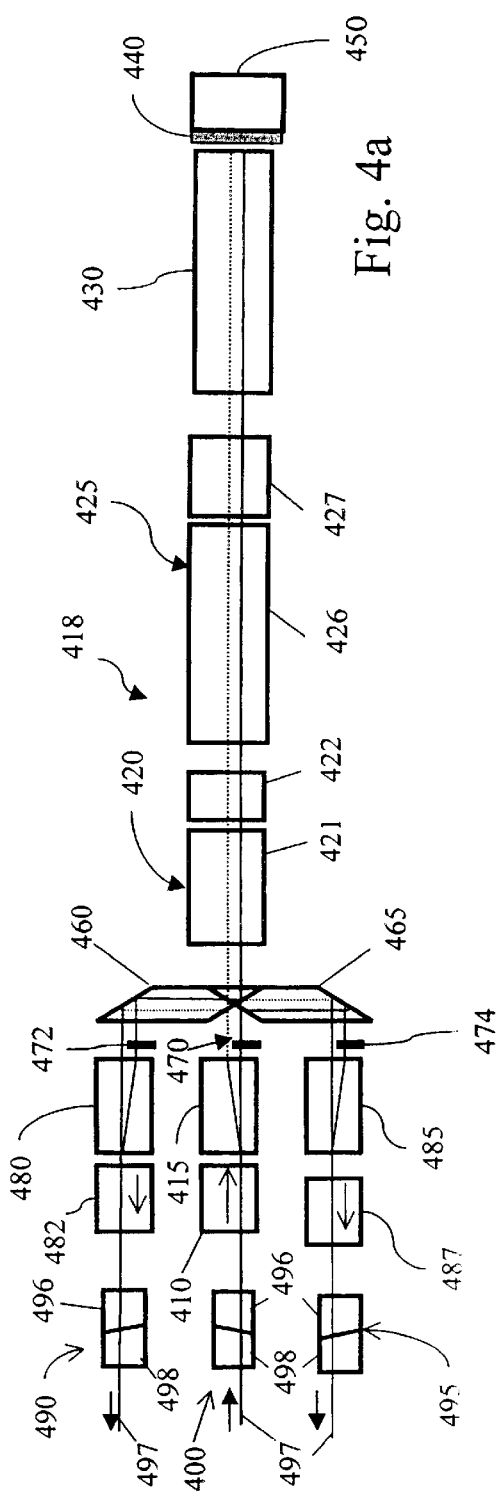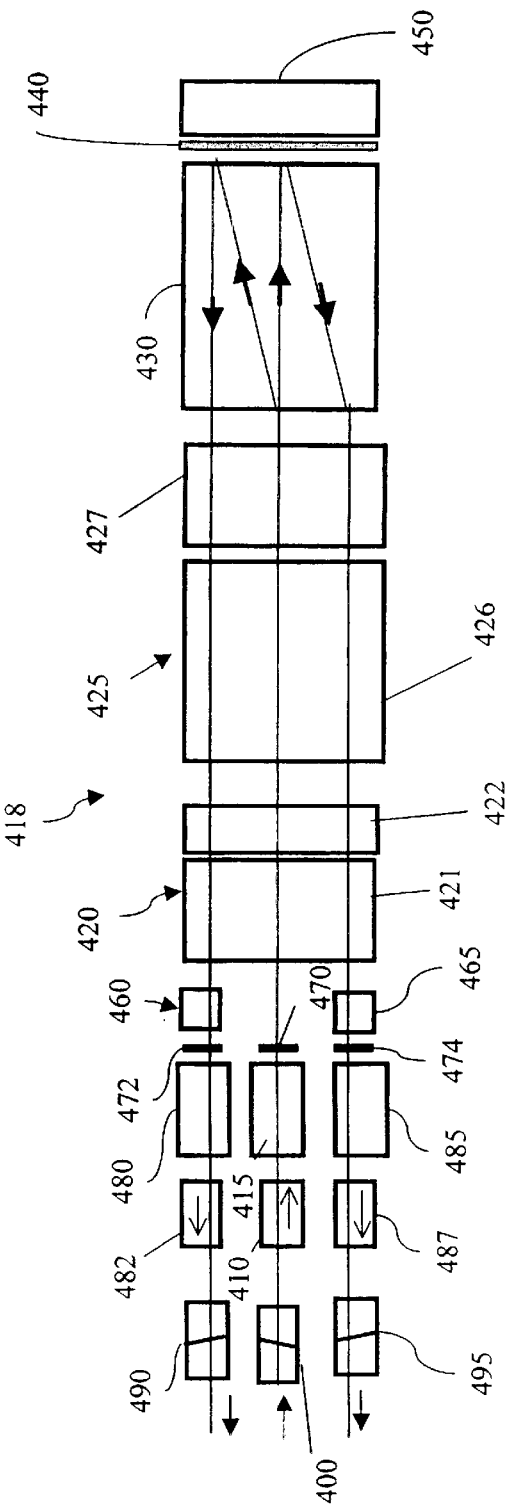

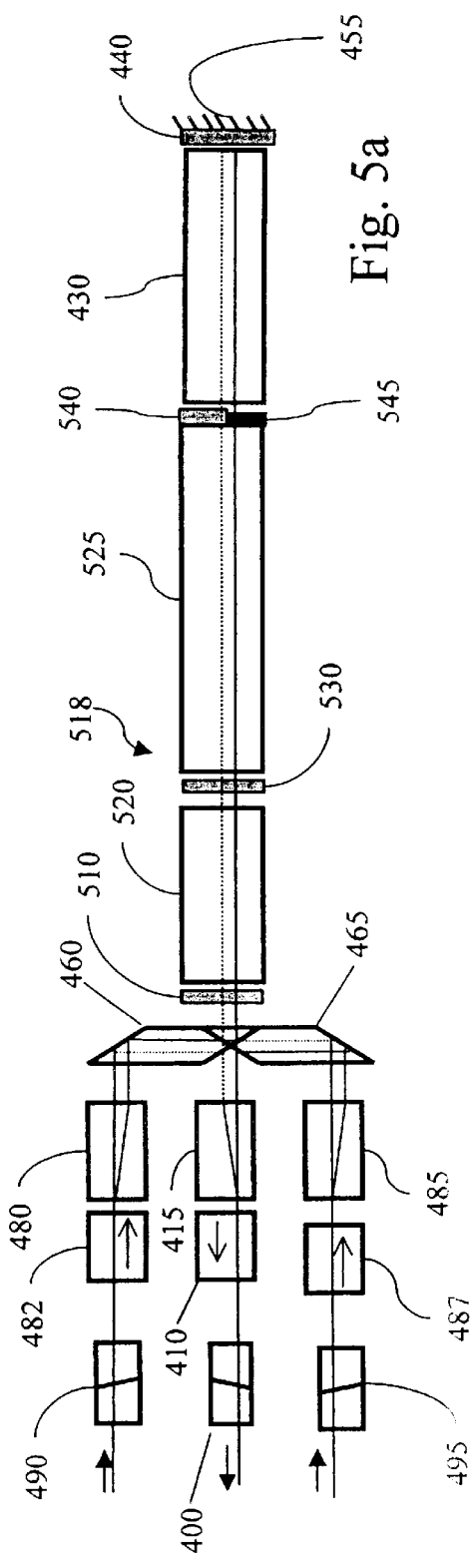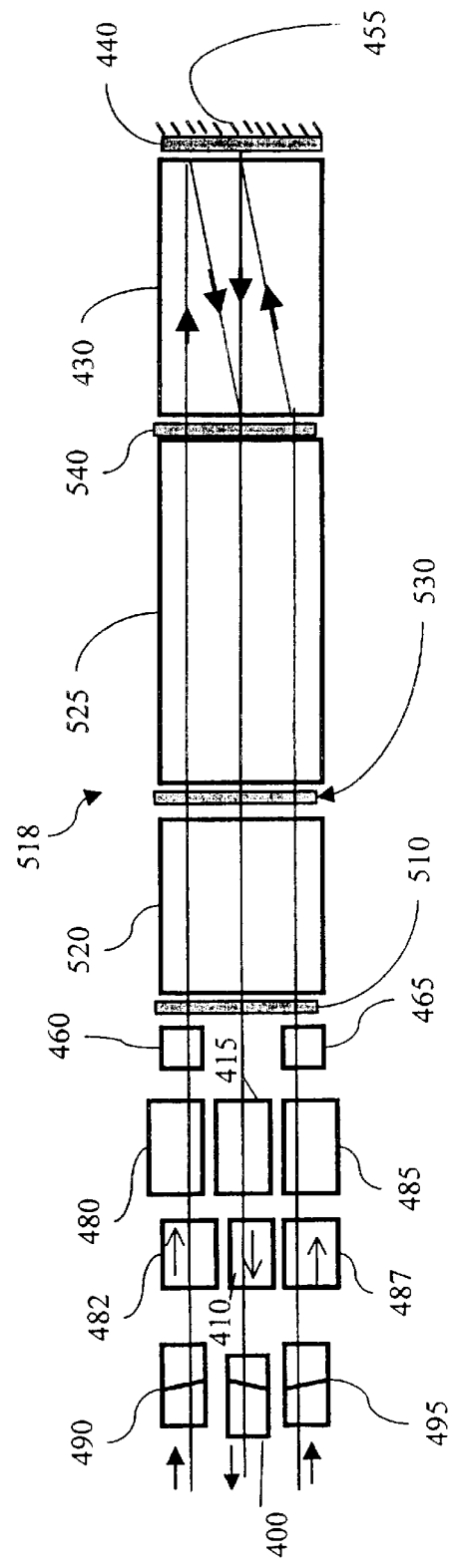
Fig. 5a
Fig. 5b

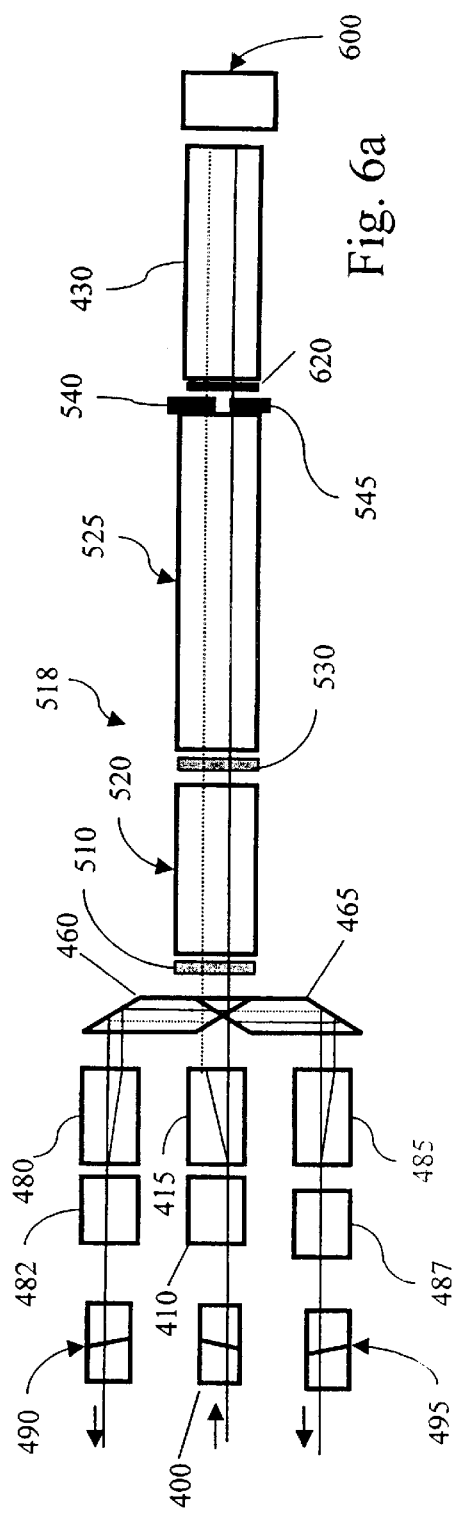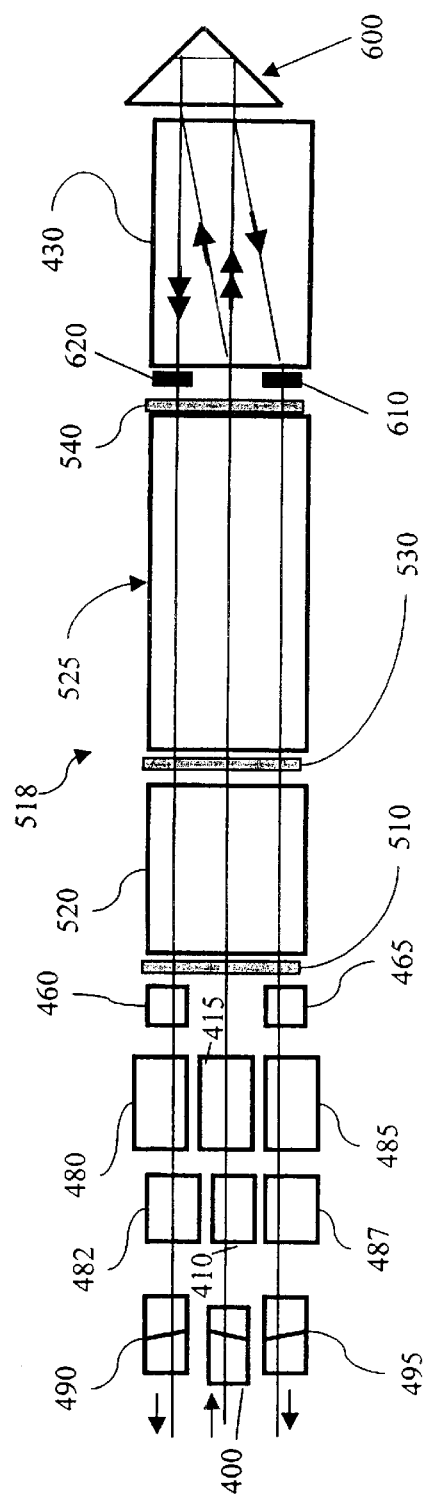

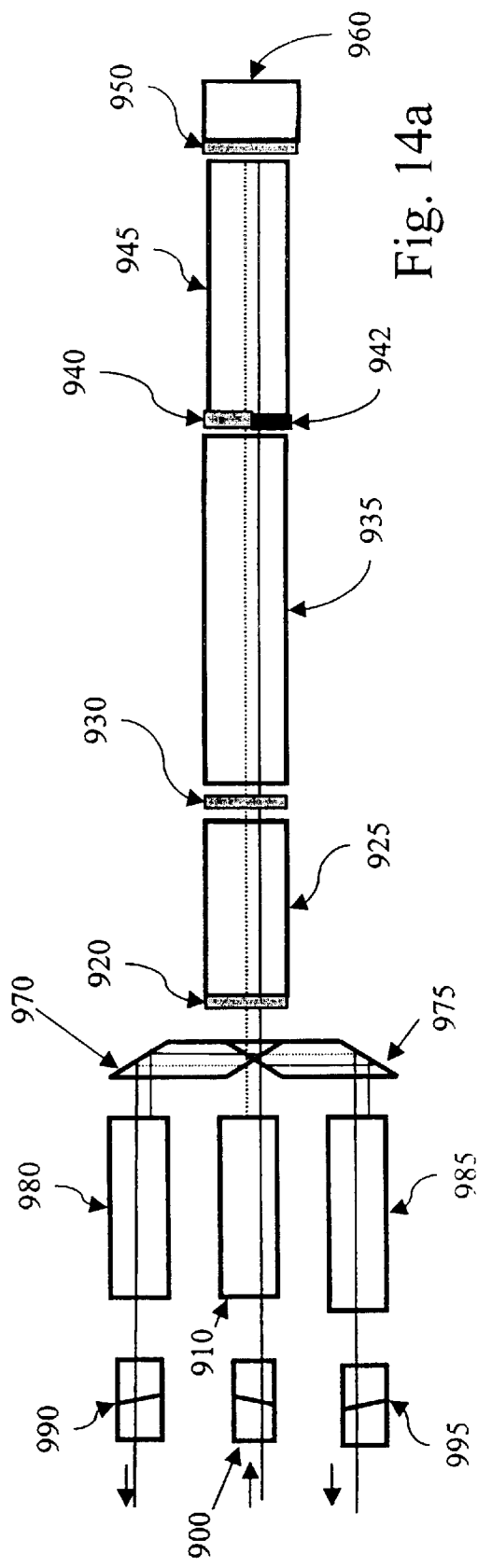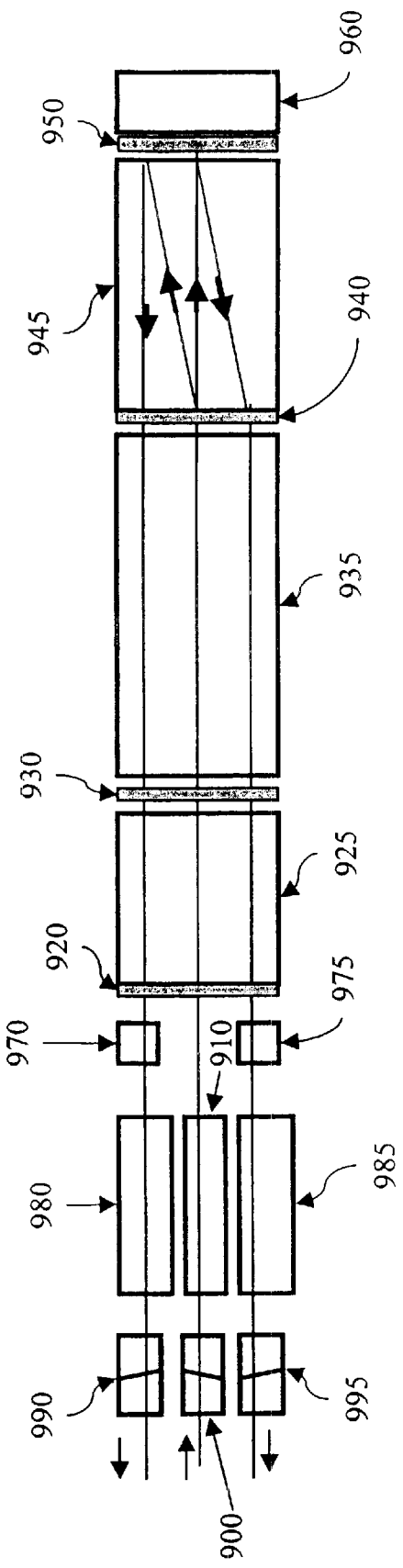

OPTICAL INTERLEAVERS/DEINTERLEAVERS

RELATED APPLICATIONS

The present application is a continuation-in-part of U.S. patent application Ser. No. 09/626,698 filed Jul. 27, 2000, which is a continuation-in-part of U.S. patent application Ser. No. 09/476,034 filed Dec. 31, 1999 and U.S. patent application Ser. No. 09/517,640 filed Mar. 3, 2000 U.S. Pat. No. 6,301,046. The present application also claims priority from U.S. Patent Application No. 60/262,375 filed Jan. 19, 2001.

FIELD OF THE INVENTION

The invention relates to optical interleaver devices, and in particular to birefringent crystal interleaver/deinterleavers for use in optical systems using wavelength division multiplexing or dense wavelength division multiplexing.

BACKGROUND OF THE INVENTION

As telecommunications usage increases, as a result of increased internet usage, increased types of communications and population growth, telecommunications providers are required to provide greater voice- and data-carrying capacity. In order to reduce the cost and the amount of time required to provide the increased capacity, wavelength division multiplexing (WDM) and dense wavelength division multiplexing (DWDM) have been developed, which provide increased capacity without requiring new fiber optic cables.

WDM and DWDM technologies combine multiple optical signals into a single fiber by transporting different signals on different optical wavelengths or channels. Interleaving and deinterleaving of optical channels is typically accomplished with thin film optical filters. However, multiple layers of film are required to interleave and deinterleave multiple channels, which increases the cost and complexity of a component. Another disadvantage of multi-layer thin film filtering is that the thin films break down over time, especially when operating under high power conditions.

What is needed is an improved optical device for use with WDM and/or DWDM optical signals. Prior attempts to improve optical devices are disclosed in U.S. Pat. No. 4,566,761 issued Jan. 28, 1986 to Carlsen et al; U.S. Pat. No. 4,685,773 issued Aug. 11, 1987 to Carlsen et al; and U.S. Pat. No. 5,694,233 issued Dec. 2, 1997 to Wu et al, which are incorporated herein by reference.

SUMMARY OF THE INVENTION

The present invention relates to an interleaver/deinterleaver apparatus comprising:

a first port for inputting or outputting a first optical signal, which comprises a second optical signal comprising at least one wavelength channel from a first subset of channels and a third optical signal comprising at least one wavelength channel from a second subset of wavelength channels;

a second port for outputting or inputting the second optical signal;

a third port for outputting or inputting the third optical signal;

a birefringent assembly optically coupled to the first, second and third ports, whereby after a first pass through the birefringent assembly the second signal exits the birefringent assembly with a polarization orthogonal to the polarization of the third signal;

first beam splitting/combining means for separating the first signal input from the first port into the second signal and the third signal, or for combining the second signal input from the second port with the third signal input from the third port into the first signal; and first reflecting means for directing the second and third signals separately back through the birefringent assembly for a second pass along second and third paths, respectively, for output via the second and third ports, respectively, or for reflecting the second and third signals, which traveled the second and third paths during a first pass, back together through the birefringent assembly for a second pass along the first path to the first port.

BRIEF DESCRIPTION OF THE DRAWINGS

The invention is illustrated by way of example, and not by way of limitation, in the figures of the accompanying drawings in which like reference numerals refer to similar elements.

FIG. 4a is a top view of one embodiment of an optical interleaver/deinterleaver having a mirror as a reflective element.

FIG. 4b is a side view of the embodiment of FIG. 4a.

FIG. 5a is a top view of one embodiment of an optical interleaver/deinterleaver having multiple half-wave plates, and a quarter wave mirror as a reflective element.

FIG. 5b is a side view of the embodiment of FIG. 5a.

FIG. 6a is a top view of one embodiment of an optical interleaver/deinterleaver having multiple half-wave plates, and a 90° prism as a reflective element.

FIG. 6b is a side view of the embodiment of FIG. 6a.

FIG. 7b is a side view of the embodiment of FIG. 7a.

FIG. 11a is a top view of an alternative embodiment of the present invention utilizing an etalon for reflecting the signals back through the birefringent assembly.

FIG. 11b is a side view of the embodiment of FIG. 11a.

FIG. 13b is a cross sectional view of the isolator structure of FIG. 13a.

FIG. 14a is a top view of one embodiment of an optical interleaver/deinterleaver having a walk-off crystal for isolation and a quarter wave mirror as a reflective element.

FIG. 14b is a side view of the embodiment of FIG. 14a.

DETAILED DESCRIPTION

Figure 1:
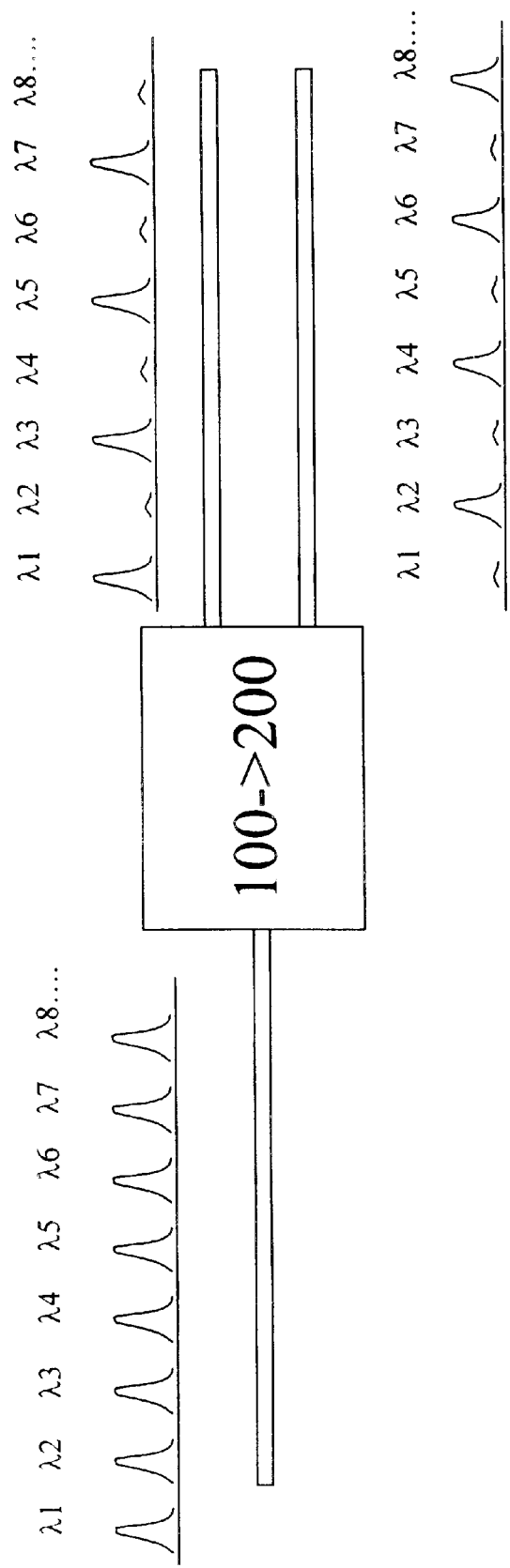
FIG. 1 is a conceptual illustration of a conversion from an optical channel scheme having 100 GHz spacing to an optical channel scheme having 200 GHz.

FIG. 1 is a conceptual illustration of a conversion from an optical channel scheme having 100 GHz spacing to an optical channel scheme having 200 GHz spacing. The conversion of FIG. 1 is useful to allow devices designed to operate with an optical channel scheme having 200 GHz channel spacing to interact with other devices or a network designed to operate with an optical channel scheme having 100 GHz channel spacing. Conversion between 100 GHz channel spacing and 200 GHz channel spacing allows, for example, network bandwidth to be increased without upgrading all of the devices that interact with the network.

In one embodiment, the converter of FIG. 1 is a deinterleaver that separates an optical signal having even and odd channels (e.g. ITU channels) into a first optical signal including the even channels and a second optical signal including the odd signals. After the signals are deinterleaved, the odd channels have a 200 GHz spacing and the even channels have a 200 GHz spacing. Recombining the even and the odd channels can be accomplished with an interleaver that combines the odd channels and the even channels into a single optical signal. In other words, the even and odd channels having 200 GHz spacing are combined (interleaved) into an optical signal having 100 GHz signal spacing. Similar interleaving can be provided to convert between 50 GHz spaced channels and 100 GHz spaced channels, as well as between other sets of channel spacing schemes.

Figure 2:
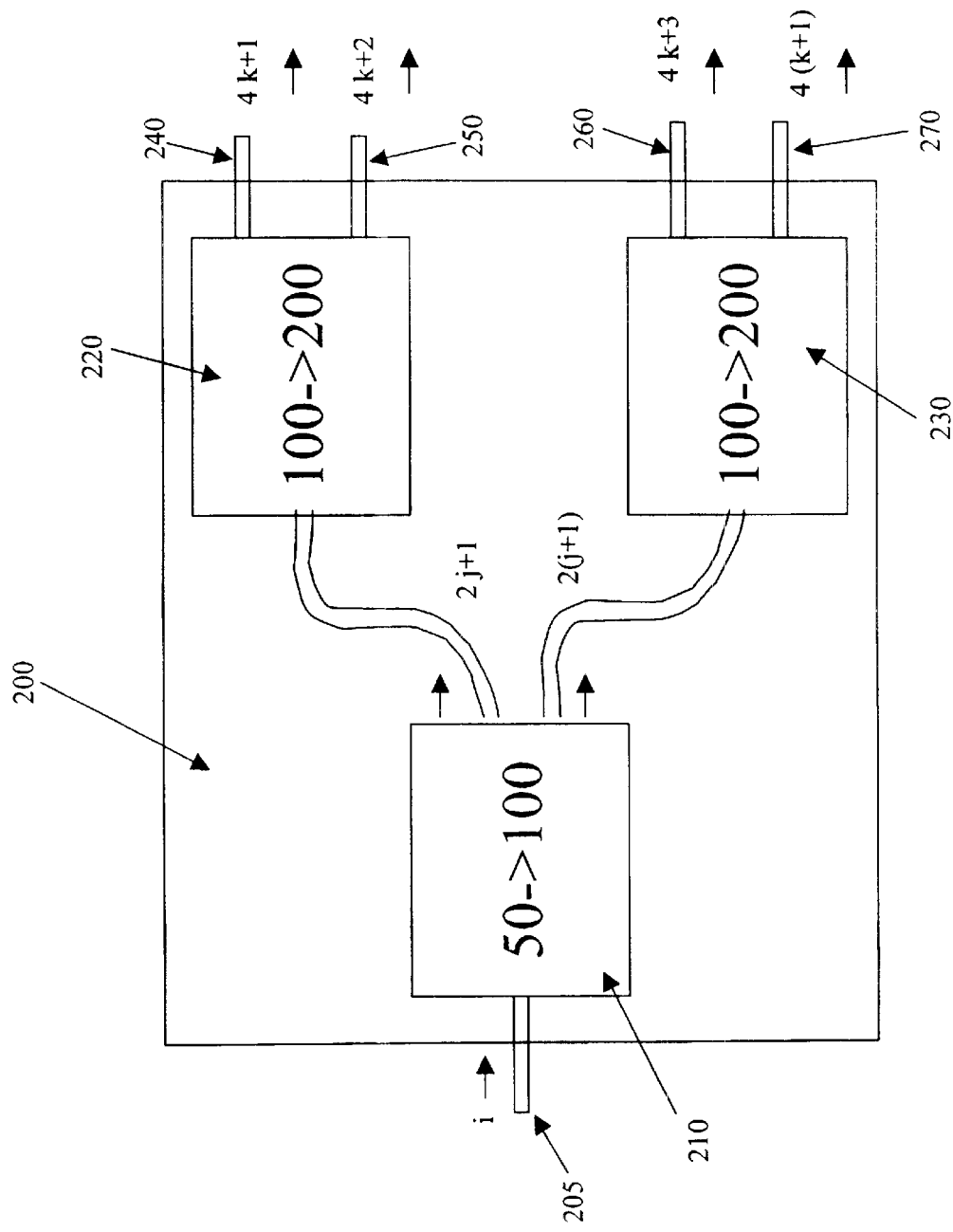
FIG. 2 is a block diagram of an optical deinterleaver for conversion from an optical channel scheme having 50 GHz spacing to an optical channel scheme having 200 GHz spacing.

FIG. 2 is a block diagram of an optical deinterleaver for conversion from an optical channel scheme having 50 GHz spacing to an optical channel scheme having 200 GHz spacing. In general, a deinterleaver 200 includes a deinterleaver 210 to convert from one set of 50 GHz spaced channels to two sets of 100 GHz spaced channels. The deinterleaver 200 also includes two deinterleavers 220 and 230, each of which converts one of the sets of 100 GHz spaced channels to two sets of 200 GHz spaced channels. The deinterleaver 200 allows devices designed for 200 GHz spaced channels to interact with devices or networks designed for 50 GHz spaced channels.

An optical fiber 205 carries a set of optical channels i, having 50 GHz spacing. The deinterleaver 210 separates the set of optical channels into sets of even, 2(j+1), and odd, 2j+1, channels. The even channels are input to the deinterleaver 230 and the odd channels are input the deinterleaver 220. The even and the odd channels have 100 GHz spacing.

The deinterleavers 220 and 230 operate to further separate the set of optical channels. Conceptually, the deinterleavers 220 and 230 operate on the respective 100 GHz spaced channels to separate the input channels into "even" and "odd" channels. The sets of channels output by the deinterleavers 220 and 230 have 200 GHz spacing.

The deinterleaver 220 separates the odd channels into two sets of channels, odd-odd channels, 4k+1, output by optical fiber 240 and odd-even, 4k+2, channels output by optical fiber 250. The deinterleaver 230 separates the even channels into two sets of channels, the even-odd, 4k+3, channels output by optical fiber 260 and the even-even, 4(k+1), channels output by optical fiber 270.

The four sets of channels output by the deinterleaver 200 are 200 GHz spaced channels. Thus, the deinterleaver 200 can be used to interface one or more devices designed to operate on 200 GHz spaced channels with one or more devices or networks designed to operate on 50 GHz spaced channels. Other channel spacing can also be supported.

Figure 3:
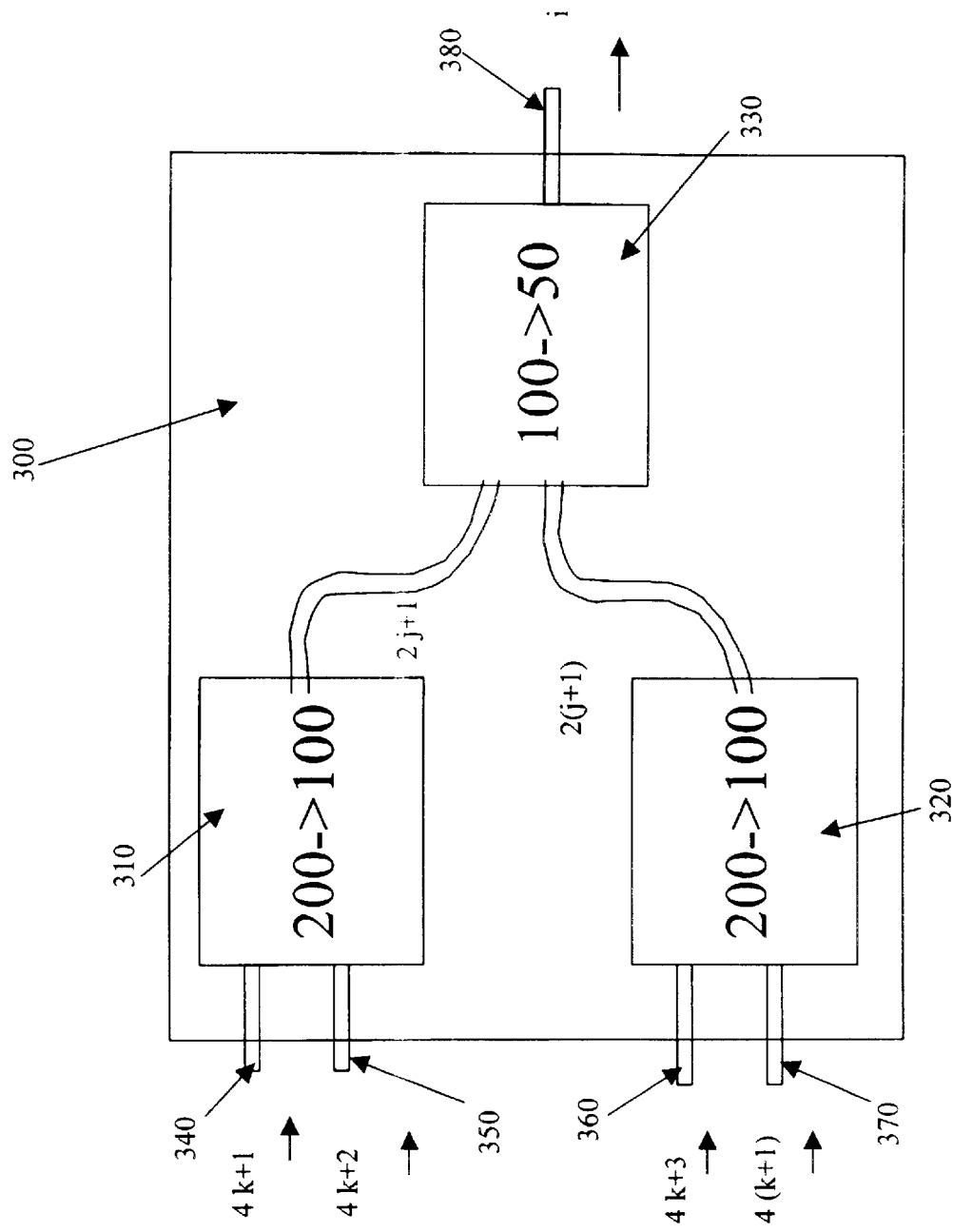
FIG. 3 is a block diagram of an optical interleaver for conversion from an optical channel scheme having 200 GHz spacing to an optical channel scheme having 50 GHz spacing.

FIG. 3 is a block diagram of an optical interleaver for conversion from an optical channel scheme having 200 GHz spacing to an optical channel scheme having 50 GHz spacing. In general, an interleaver 300 includes an interleaver 310 to convert from two sets of 200 GHz spaced channels to one set of 100 GHz spaced channels. Similarly, an interleaver 320 converts from two sets of 200 GHz spaced channels to one set of 100 GHz spaced channels. The interleaver 330 converts the two sets of 100 GHz spaced channels to one set of 50 GHz spaced channels. The interleaver 300 allows devices designed for 200 GHz spaced channels to interact with devices or networks designed for 50 GHz spaced channels.

The odd-odd, 4k+1, channels having 200 GHz spacing are input to the interleaver 310 via an optical fiber 340. The odd-even, 4k+2, channels having 200 GHz spacing are input to an interleaver 310 via an optical fiber 350. An interleaver 310 interleaves the odd-odd channels and the odd-even channels to generate a set of odd, 2j+1, channels having 100 GHz spacing.

The even-odd, 4k+3, channels having 200 GHz spacing are input to an interleaver 320 via an optical fiber 360. The even-even, 4 (k+1), channels having 200 GHz spacing are input to an interleaver 320 via an optical fiber 370. The interleaver 320 interleaves the even-odd channels and the even-even channels to generate a set of even, 2(j+1), channels having 100 GHz spacing.

The interleaver 330 interleaves the even and odd channels to generate a set of channels, i, having 50 GHz spacing. Thus, the interleaver 300 allows devices designed to operate on optical channels having 200 GHz spacing to interact with devices designed to operate on optical channels having 50 GHz spacing. Other channels spacing can also be supported.

FIG. 4a and 4b illustrate one embodiment of an optical interleaver/deinterleaver according to the present invention having a quarter wave mirror as a reflective element. The arrows of FIG. 4a correspond to the interleaver/deinterleaver operating as a deinterleaver. In other words, an optical signal carrying information on multiple frequencies, e.g. a wavelength division multiplexed (WDM) signal, is received and separated into two optical signals, each of which includes a predetermined subset of frequencies (e.g. even channels and odd channels) from the input optical signal.

An optical signal is received through a first port 400. In one embodiment, the first port 400 is a collimator assembly having a GRIN lens to collimate the light. Other types of lenses can also be used, or pre-collimated light can be received. The collimated light is directed to an isolator 410. One embodiment of an isolator that can be used to provide the isolator 410 is described in greater detail below with respect to FIGS. 13a and 13b; however, other isolators can be used, for example the isolator of FIG. 15, or the isolator can be omitted.

The optical signal then passes through a walk-off crystal 415, which separates the ordinary and extraordinary sub-beams of the optical signal. One of the sub-beams passes through a half wave plate 470, which introduces a relative phase difference of 180° between the ordinary and extraordinary components of the optical signal resulting in the state of polarization of the sub-beam being rotated by 90°, thereby ensuring both sub-beams have the same polarization, e.g. vertically polarized.

The collimated optical sub-beams are directed to a birefringent assembly 418 through an opening between a walk-off crystal 460 and a walk-off crystal 465 along a first path, see FIG. 4b. The birefringent assembly 418 preferably includes a first birefringent element 420 and a second birefringent element 425. In one embodiment, the birefringent element 420 is composed of two crystals, together having an optical path length L, that are selected to provide improved thermal stability over a range of operating temperatures as compared to a single birefringent crystal. In one embodiment, one crystal 421 is a $TiO_2$ crystal and a second crystal 422 is a $YVO_4$ crystal, each having the appropriate thickness to provide interleaver/deinterleaver function for the desired channel spacing, e.g. 100 GHz. Other birefringent elements can also be used, for example, a single crystal can be used if temperature stability is not important, or other multiple-crystal birefringent elements can be used. In one embodiment, birefringent element 420 is oriented with a 45° azimuth angle; however, other azimuth angles can also be used.

The optical signal then passes through the second birefringent element 425. In one embodiment, the second birefringent element 425 is composed of two crystals together having an optical path length of 2L. In one embodiment, one crystal 426 is a $TiO_2$ crystal and the second crystal 427 is a $YVO_4$ crystal. In another embodiment (see FIGS. 11a and 11b) the second birefringent element is comprised of two sets of crystals, each set being similar to the set that makes up the first birefringent element 420. A single crystal birefringent element can also be used (see FIGS. 5a and 5b). In one embodiment, birefringent element 425 has an azimuth angle of −12°; however, other azimuth angles can also be used.

The birefringent assembly 418 may contain more birefringent elements dependent upon the desired output, i.e. birefringent elements forming configurations such as: L-2L-2L or L-2L-4L.

As a result of passing through the birefringent assembly, certain wavelengths, e.g. the odd ITU channels, have their polarization rotated by 90°, e.g. from vertical to horizontal, while the polarization of the other wavelengths, e.g. the even ITU channels, remains the same, e.g. vertically polarized.

The optical sub-beams then pass to a polarization beam splitter/combiner, preferably in the form of a walk-off crystal 430, where the first set of wavelengths are separated from the second set of wavelengths in each sub-beam according to their polarization states. The first set of wavelengths, e.g. the horizontally polarized odd ITU channels, are passed directly through the walk-off crystal 430, while the second set of wavelengths, e.g. the vertically polarized even ITU channels, get walked off. The sub-beams then pass through a quarter wave plate 440 and get reflected by a mirror 450 back through the quarter wave plate 440 to the birefringent assembly 418 for a second pass. However, as a result of the double pass through the quarter wave plate 440, the polarization of both sets of wavelengths is rotated by 90°. Accordingly, the first set of wavelengths, e.g. the odd ITU channels, becomes vertically polarized and gets walked off from the first path to a second path, while the second set of wavelengths, e.g. the even ITU channels, becomes horizontally polarized and passed directly through the walk-off crystal 430 following along a third path. The combination of the quarter wave plate 440 and the mirror 450 not only directs the sub-beams to the appropriate ports, but reduces the chromatic dispersion caused by the interleaver/deinterleaver by providing orthogonal orientations for the optical signals passing in the forward direction and in the backward direction through the birefringent assembly 418.

The mirror 450 reflects the optical signals back through the walk-off crystal 430 and the birefringent assembly 418 to the walk-off crystals 460 and 465, which are positioned in the third and second paths, respectively. Again, the birefringent assembly rotates the polarization of first set of channels (from vertical to horizontal), while having no cumulative effect on the polarization of the second set of channels. The walk-off crystal 465 directs the sub-beams of the first set of wavelengths, e.g. the odd ITU channels, to a walk-off crystal 485, in which the two sub-beams are combined. Prior to entering the walk-off crystal 485 one of the sub-beams is passed through a half-wave plate 474, which rotates the polarization of the sub-beam by 90°, thereby ensuring that the sub-beams are orthogonally polarized for recombination. Subsequently, the combined beam passes through an isolator 487 to a second port 495. Similarly, a walk-off crystal 460 directs the sub-beams of the second set of wavelengths, e.g. the even ITU channels, through or by a half wave plate 472, a walk-off crystal 480 and an isolator 482 to a third port 490. Provided at each of the ports 400, 490 and 495 is a lens 496 optically coupled to one end of an optical fiber 497, which is surrounded by a ferrule 498.

The effect of the birefringent elements 420 and 425, the walk-off crystal 430, the quarter wave plate 440 and the mirror 450 is to separate (deinterleave) sets of optical signals having a predetermined frequency separation, free spectral range (FSR). The FSR of the channels separated can be 200 GHz or 100 GHz as specified by the International Telecommunications Union (ITU), or any other FSR value (e.g., 50 GHz, 25 GHz).

As is evident to one skilled in the art, the aforementioned device can also be used to interleave two separate sets of channels input the ports 490 and 495 into a single set of channels for output the port 400.

FIGS. 5a and 5b illustrate another embodiment of an optical interleaver/deinterleaver having multiple half-wave plates for re-orienting the sub-beams between birefringent elements, and a quarter wave plate 440 with a reflective coating 455 as a reflective element. The arrows of FIG. 5a illustrate operation as an interleaver. The interleaver/deinterleaver of FIG. 5a operates in a similar manner as interleaver/deinterleaver of FIGS. 4a and 4b except that birefringent elements 520 and 525 are single crystals and have azimuth angles of 0°. Half wave plates 510, 530, 540 and 545 are positioned before, between and after the birefringent elements 520 and 525 for re-orienting the sub-beams accordingly.

The half wave plate 510 is positioned between reflective prisms 460 and 465 and the first birefringent element 520. In one embodiment, the half wave plate 510 is oriented with an azimuth angle of 22.5°. In alternate embodiments, other azimuth angles can be used.

The half wave plate 530 is positioned between the first birefringent element 520 and the second birefringent element 525. In one embodiment, the half wave plate 530 is oriented with an azimuth angle of −28.5°. In alternate embodiments, other azimuth angles, other materials and another thickness can be used.

The half wave plates 540 and 545 are positioned between the second birefringent element 525 and the walk-off crystal 430. One of the sub-beams passing from the second birefringent element 525 to the walk-off crystal 430 passes through a half wave plate 540, while the other sub-beam passes through a half wave plate 545. In one embodiment, half wave plates 540 and 545 are oriented with azimuth angles of −6.5° and 38.5°, respectively. Since the half-wave plates 472, 474 and 470 are omitted from this embodiment, the sub-beams originating from the walk-off crystals 480 and 485 enter the first birefringent element 520 orthogonally polarized. Accordingly, the wave plates 540 and 545 are used to rotate the sub-beams so that they have the same state of polarization and the proper orientation for entry into the walk-off crystal 430. In alternate embodiments, other azimuth angles, other materials and other thicknesses can be used.

To operate as an interleaver, two sets of optical signals are input separately via ports 490 and 495. The orientations of isolators 410, 482 and 487 are reversed as compared to the deinterleaver embodiment illustrated in FIG. 4a. The two sets of optical signals are combined in a manner that is the reverse of the deinterleaver function described above. The combined (interleaved) optical signal is output through port 400. Thus, the apparatus illustrated in FIG. 4a can operate as an interleaver or as a deinterleaver.

FIGS. 6a and 6b illustrate another embodiment of an optical interleaver/deinterleaver having multiple half-wave plates and a 90° prism 600 as a reflective element. The prism 600 can be replaced by any element that includes two perpendicular reflective surfaces. With this arrangement the first set of wavelengths traveling along the first path, e.g. the odd ITU channels, represented by the double arrow, are reflected back through the birefringent assembly 518 along the third path and out the third port 490. Moreover, the second set of wavelengths, e.g. the even ITU channels, represented by a single arrow, are reflected back through the birefringent assembly 518 along the second path and out the second port 495. To minimize dispersion, half-wave plates 610 and 620 rotate the polarizations of the signals by 90° so that the signals entering the birefringent assembly 518 for the second pass have a state of polarization orthogonal to their state of polarization when they exited the birefringent assembly 518 after the first pass. The remaining components of the interleaver/deinterleaver are the same as FIGS. 5a and 5b. In an alternate embodiment the remaining components of the interleaver/deinterleaver can be the same as FIGS. 4a and 4b.

Figure 7A:
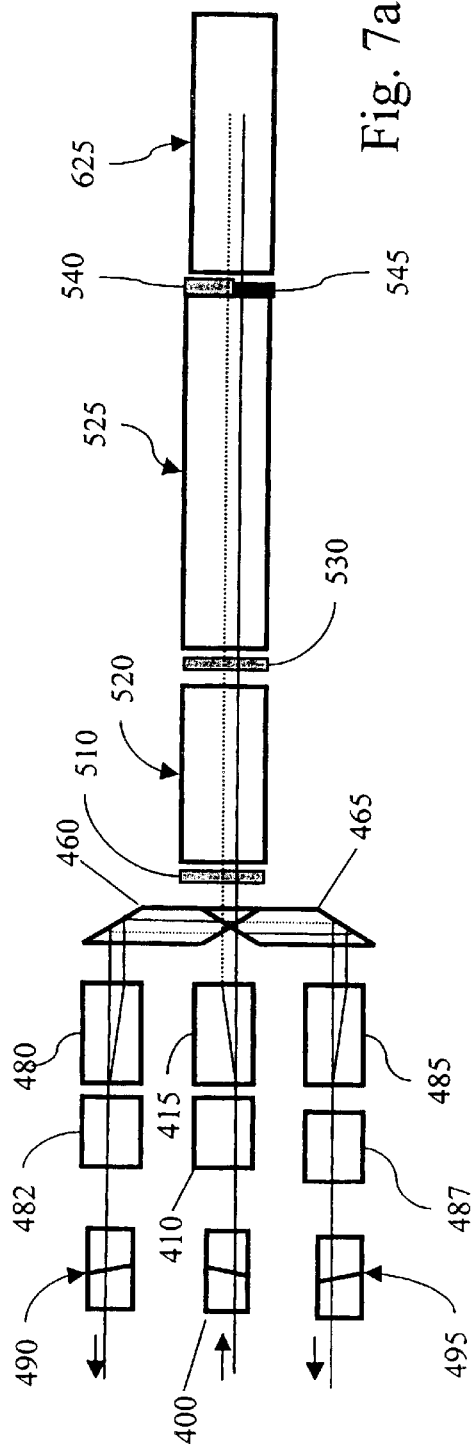
FIG. 7a is a top view of one embodiment of an optical interleaver/deinterleaver having multiple half-wave plates, and a polarization beam splitter and reflective prism assembly as a reflective element.
Figure 7B:
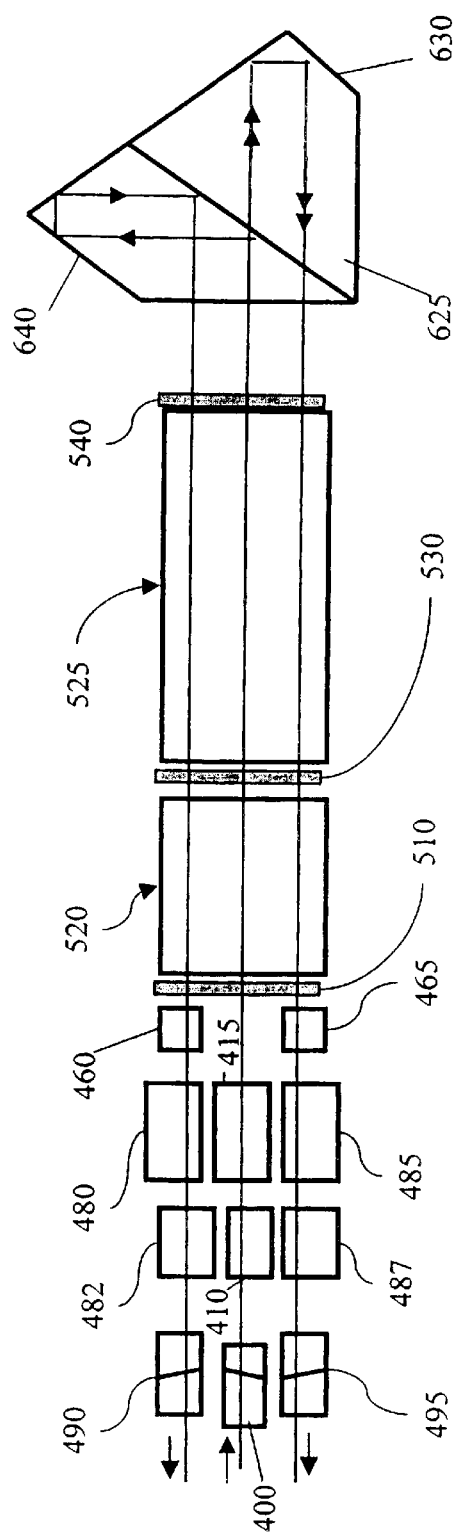

FIGS. 7a and 7b illustrate another embodiment of an optical interleaver/deinterleaver having a polarization beam splitting (PBS) cube 625 for splitting/combining the input signals, and a pair of reflective prism assemblies 630 and 640 as a reflective element. The first set of channels, e.g. the odd ITU channels, is passed through the PBS 625 and reflected by the reflective prism 630 back along the second path to the second port 495, while the second set of channels, e.g. the even ITU channels, is reflected by the PBS towards the reflective prism 640, which reflects the second set of channels back along the third path to the third port 490. The remaining components of the interleaver/de-interleaver are the same as FIGS. 5a and 5b. In an alternate embodiment the remaining components of the interleaver/deinterleaver can be the same as FIGS. 4a and 4b.

Figure 8:
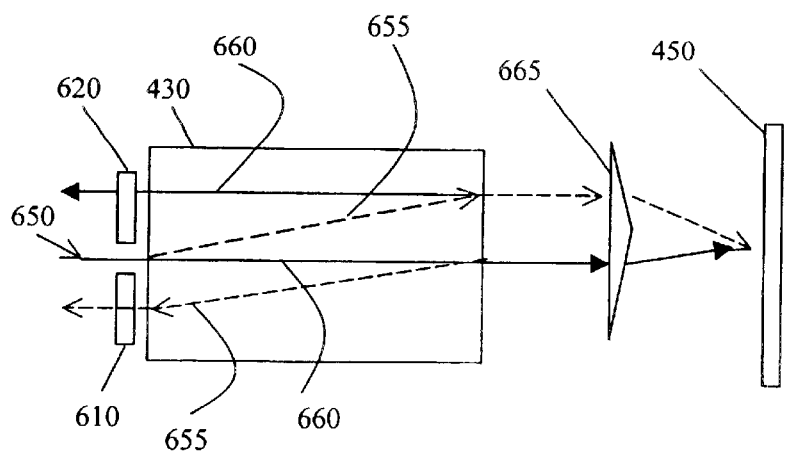
FIG. 8 illustrates an alternative means by which the signals are reflected back through the birefringent assembly using a prism and a mirror.
Figure 9:
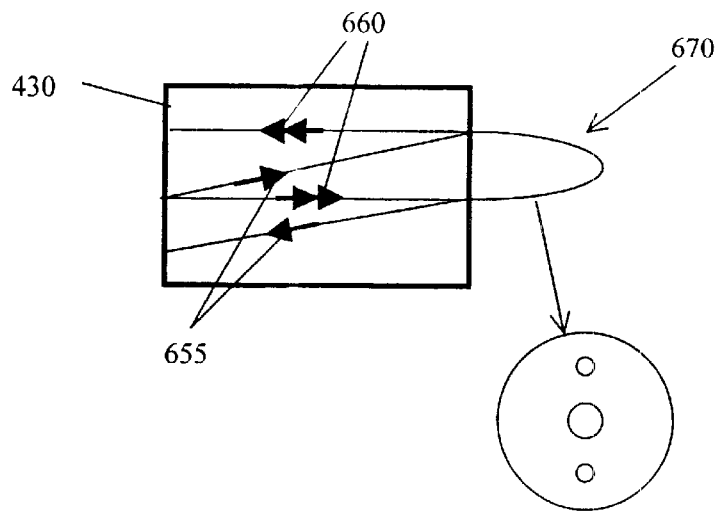
FIG. 9 illustrates an alternative means by which the signals are reflected back through the birefringent assembly using a polarization maintaining fiber.
Figure 10:
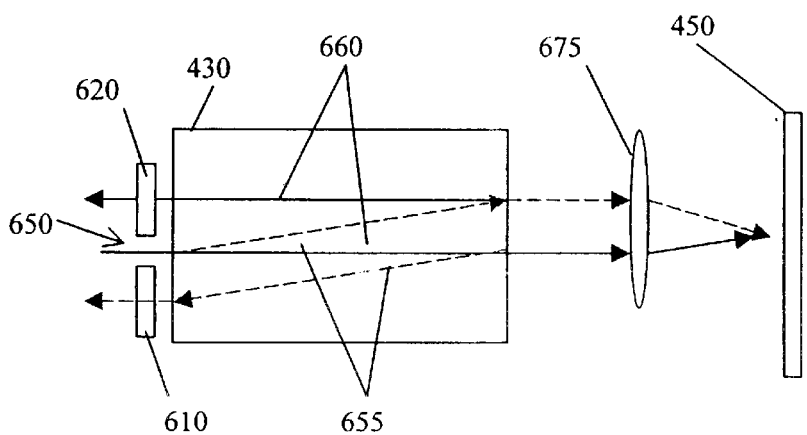
FIG. 10 illustrates an alternative means by which the signals are reflected back through the birefringent assembly using a lens and a mirror.

FIGS. 8, 9 and 10 illustrate alternative embodiments for reflecting the signals, split by the walk-off crystal 430, without affecting the state of polarization thereof. In FIG. 8, an input signal 650 is separated into a first set of channels 655, having a first polarization, and a second set of channels 660, having a second polarization, by the walk-off crystal 430. A prism 665 is used to direct the two signals 655 and 660 at identical angles relative to the normal of the mirror 450. Accordingly, the signals 655 and 660 will be transposed for the return trip. However, since the polarizations of the signals 655 and 660 remains the same, signal 660 will pass straight through the walk-off crystal 430 again, while signal 655 will get walked off again. The half wave plates 610 and 620 are used to rotate the polarization of the signals 655 and 660 for the return trip through the birefringent assembly (not shown).

Alternatively, as shown in FIG. 10, the prism 665 can be replaced by a lens 675, which performs the same function as the prism 665 if the mirror is positioned in the focal plane of the lens, and if the sub-beam 655 intersects the lens 675 at an equal distance from the optical axis thereof as the sub-beam 660.

In FIG. 9, a polarization maintaining (PM) fiber 670 is used to direct the first and second signals 655 and 660 back through the walk-off crystal 430 with the same polarization as during the first pass, so that the path taken during second pass through the walk-off crystal 430 is parallel to the path taken during the first pass.

Figure 11:
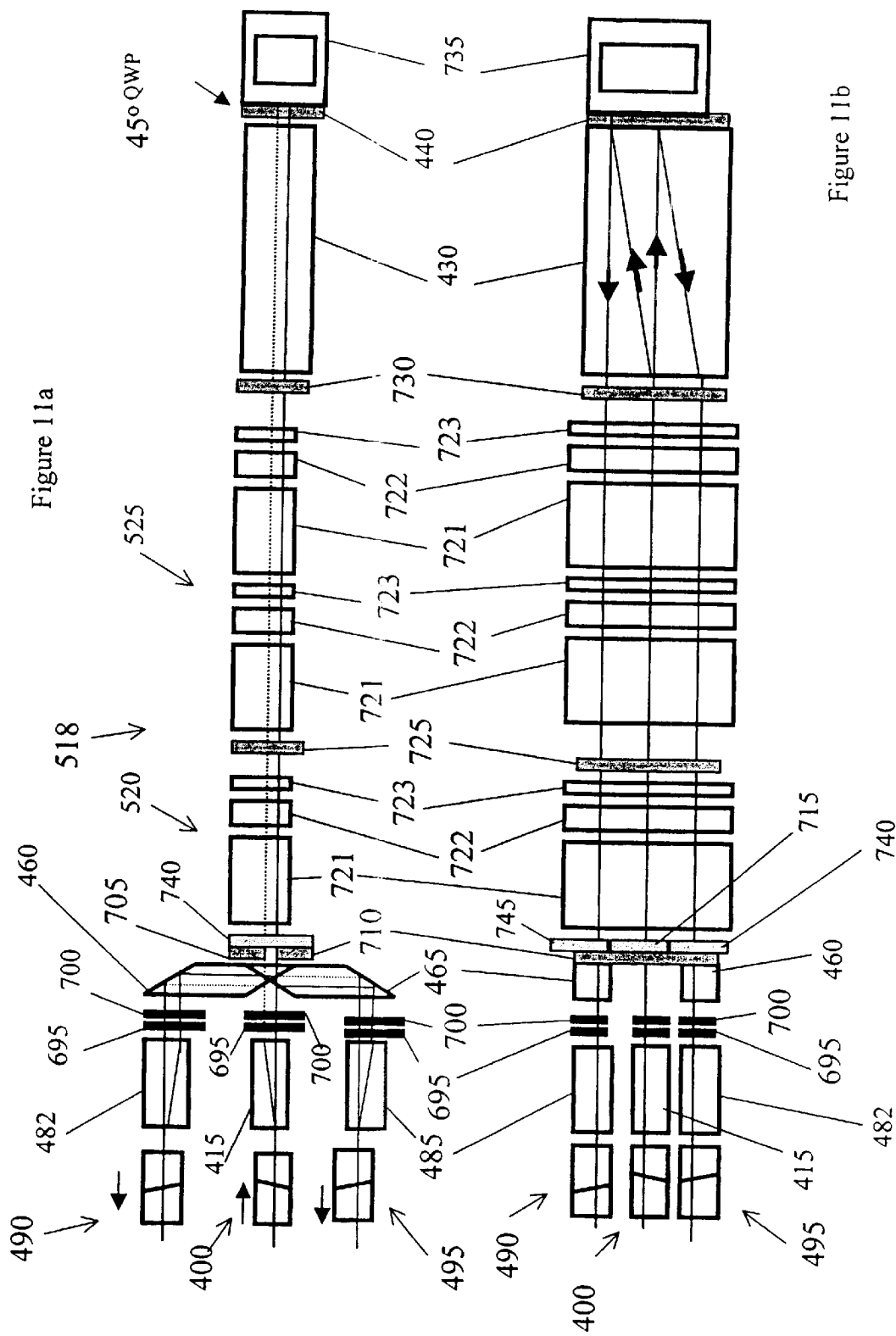
Figure 12:
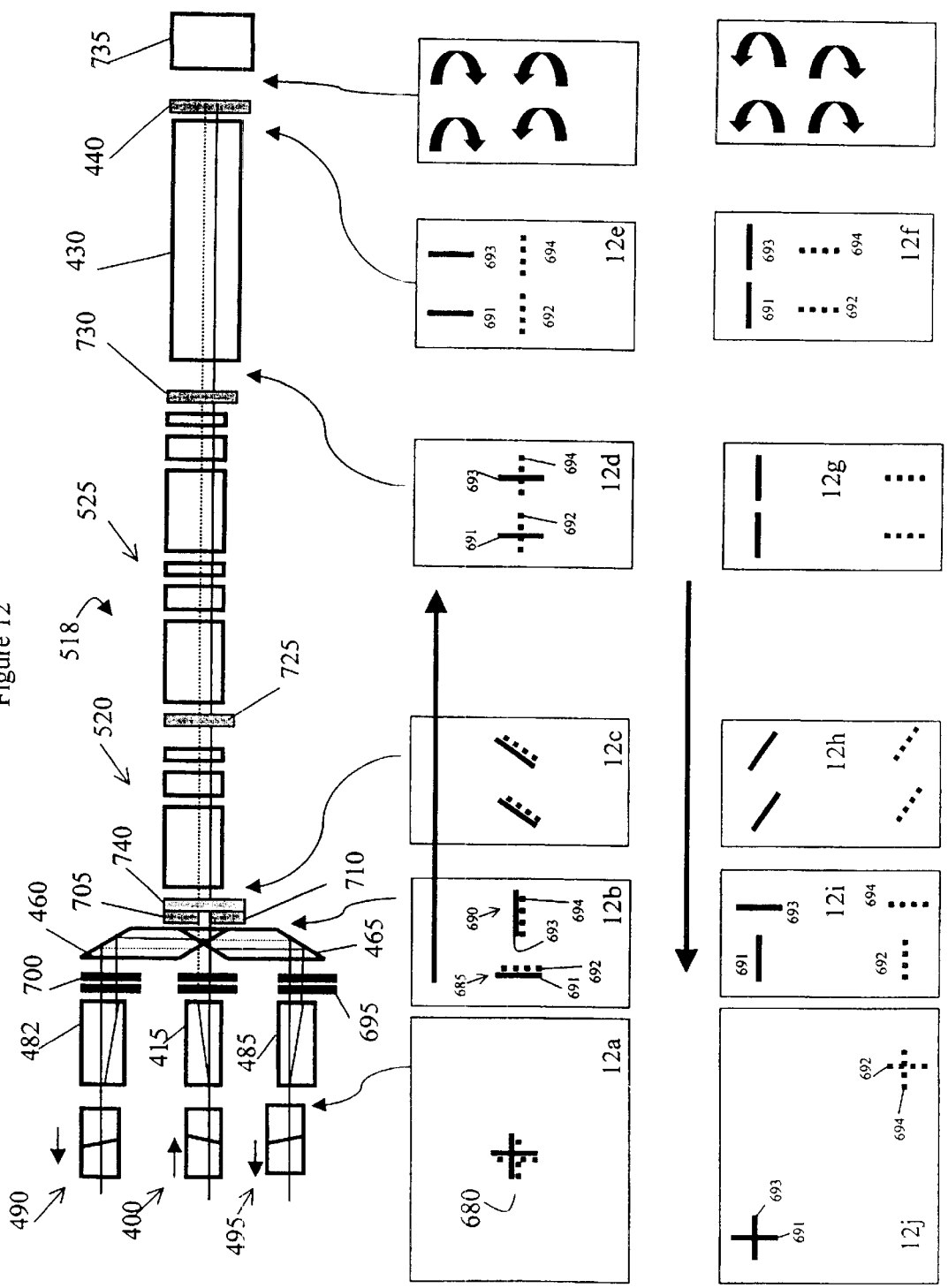
FIG. 12 is a plot of polarization states (12a to 12f) for the embodiment of FIGS. 11a and 11b.

FIGS. 11a and 11b illustrate another embodiment of the present invention, which will be described in detail with reference to FIG. 12. The device of FIGS. 11a and 11b is similar to the device of FIGS. 5a and 5b, except for the use of different wave plate orientations and the use of an etalon for reflecting the signals back through the birefringent assembly. Initially, (FIG. 12a) a mixed signal 680 is launched via the input port 400 through the walk-off crystal 415, which divides the mixed signal 680 into two orthogonally polarized sub-beams 685 and 690 (FIG. 12b). The first sub-beam 685 comprises a sub-beam 691 including channels from a first set of channels, preferably odd numbered ITU channels, and a sub-beam 692 including channels from a second set of channels, preferably even numbered ITU channels. The second sub-beam 690 comprises a sub-beam 693 including channels from the first set of channels, and a sub-beam 694 including channels from the second set of channels. The sub-beams 685 and 690 exiting the walk-off crystal 415 are passed through a non-reciprocal rotator comprised of a Faraday rotator 695 and a half wave plate 700. In the input or forward direction the polarization rotation caused by the Faraday rotator 695 and the half wave plate 700 cancel each other, while in the reverse or output direction they combine to rotate the polarization of the sub-beams by 90°. Subsequently, one of the sub-beams (e.g. the vertically polarized sub-beam 685) passes through a half wave plate 705 oriented at 22.5°, resulting in a polarization rotation of 45°. Simultaneously, the other sub-beam (e.g. the horizontally polarized sub-beam 690) passes through a half wave plate 710 oriented at −22.5°, resulting in a polarization rotation of −45°. As a result, both sub-beams have the same polarization (FIG. 12c) for entry into the birefringent assembly 518. Before entering the birefringent assembly 518, both of the sub-beams are passed through a 45° polarizer 715 to ensure that all of the light passed to the birefringent assembly 518 is oriented correctly.

In this embodiment the first birefringent element 520 includes: a first crystal 721, preferably $YVO_4$; a second crystal 722, preferably $TiO_2$; and a third crystal, preferably $SiO_2$. The second birefringent element 525 includes two sets of crystals, which are identical to each other and to the set of crystals making up the first birefringent element 520. Between the first birefringent element 520 and the second birefringent element 525 is a half wave plate 725, preferably oriented at an angle of −28.5°. Another half wave plate 730, preferably oriented at an angle of −6.5°, is positioned after the second birefringent element 525.

Passage through the birefringent assembly 518 results in the sub-beams 691 and 693 including the first set of channels (e.g. the odd channels) rotating −45° and becoming vertically polarized, while the sub-beams 692 and 694 including the second set of channels (e.g. the even channels) rotate 45° and become horizontally polarized (See FIG. 12d). Due to the fact that the birefringent assembly 518 is arranged so that the first set of channels (e.g. the odd ITU channels) will have a polarization orthogonal to the second set of channels after passing therethrough, a polarization beam splitting device, i.e. walk-off crystal 430, can spatially displace sub-beams 691 and 693 from sub-beams 692 and 694 (FIG. 12e). A double pass through the quarter wave mirror 440 results in a 90° rotation in the state of polarization of all of the sub-beams 691, 692, 693 and 694 (FIG. 12f). In this embodiment the basic mirror is replaced by an etalon 735. The etalon 735 improves the isolation at the cross-over region, and provides better return loss than the basic quarter wave plate/mirror design.

The second pass through the walk-off crystal 430 spatially separates the sub-beams 691 and 693 farther from the sub-beams 692 and 694, due to the change in their polarization (FIG. 12g). Accordingly, the sub-beams 691 and 693 travel along a second path through the birefringent assembly 518, which is parallel to the first path taken by the combined sub-beams 685 and 690. Similarly, the sub-beams 692 and 694 travel along a third path through the birefringent assembly 518, which is also parallel to the first path.

The second pass through the first and second birefringent elements 520 and 525 has the opposite effect on the sub-beams as the first pass, i.e. the polarization of the sub-beams 691 and 693 is rotated by 45°, while the polarization of the sub-beams 692 and 694 is rotated by −45°. However, since both sets of sub-beams had orthogonal polarizations prior to the second pass, all of the sub-beams exit the first birefringent element 520 with similar polarizations (FIG. 12h).

The sub-beams 692 and 694 then pass through a −45° polarizer 740, while the sub-beams 691 and 693 pass through a −45° polarizer 745. To facilitate the combining of the sub-beam 691 with the sub-beam 693, and the sub-beam 692 with the sub-beam 694, sub-beams 691 and 692 are passed through the half wave plate 705, while the sub-beams 693 and 694 are passed through the half wave plate 710, thereby making the polarization of sub-beams 691 and 692 orthogonal to the polarization of sub-beams 693 and 694, respectively (FIG. 12i). To ensure that all of the sub-beams travel an equal path length, the outgoing sub-beams are passed through wave plates 700 and Faraday rotators 695, which combine to rotate their polarizations by 90°. Accordingly, the sub-beams 691 and 692, which traveled the extraordinary path through the walk-off crystal 415 will travel the ordinary path through the walk-off crystals 482 and 485, respectively. The combined signal including the sub-beams 691 and 693, e.g. the odd ITU channels, is output via the port 490, while the combined signal including the sub-beams 692 and 694, e.g. the even ITU channels, is output via the port 495 (FIG. 12j).

Figure 13B:
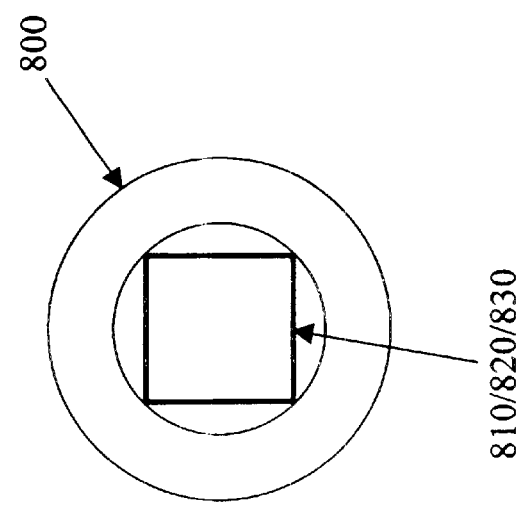
Figure 13A:
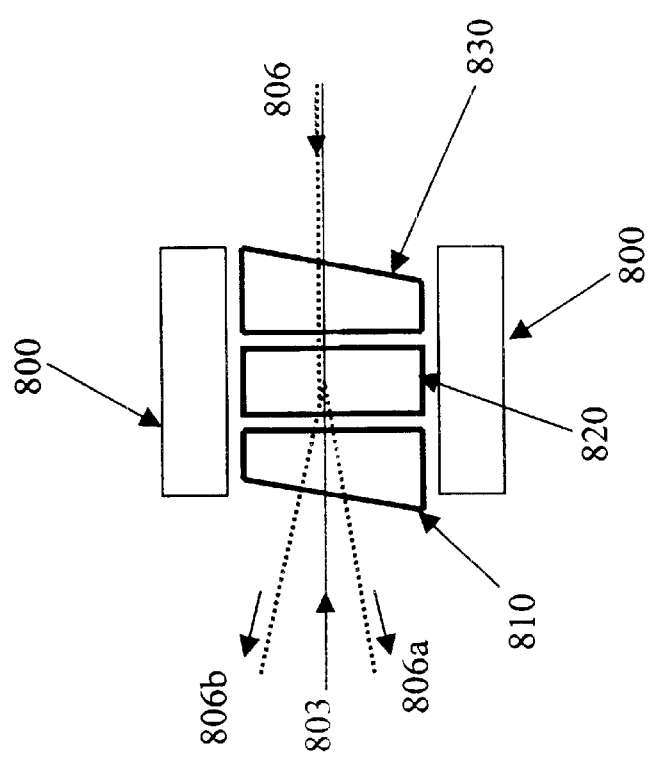
FIG. 13a is a side view of an isolator structure that can be used with, for example, the interleaver/deinterleavers of FIGS. 4–7.

FIGS. 13a and 13b illustrate an isolator structure that can be used with, for example, the interleaver/deinterleavers of FIGS. 4–7. In general, the isolator of FIGS. 13a and 13b allows optical signals 803 to pass in one direction, while separating optical signals 806 passing in the opposite direction into signals 806a and 806b. The angle at which the optical signals are separated is determined by the angles of wedges 810 and 830.

In one embodiment, the wedges 810 and 830 and a garnet 820 are disposed within a casing 800, which is a permanent magnet. In an alternate embodiment, the casing 800 generates an electrically controlled magnetic field. In one embodiment, the garnet 820 is a 45° garnet that causes a 45° rotation in the polarization of the optical signals that pass therethrough.

In one embodiment, the wedges 810 and 830 have wedge angles in the range of 5° to 25° (e.g. ≈10°). In one embodiment, the wedges 810 and 830 are made of $YVO_4$; however, other materials can also be used. The wedges 810 and 830 have predetermined angles between the x-Doc. axis and the y-axis. In one embodiment, the wedge 810 has an angle of 22.5° and wedge 830 has an angle of −22.5°. In alternate embodiments, other angles can be used.

FIGS. 14a and 14b illustrate another embodiment of an optical interleaver/deinterleaver having a walk-off crystal for isolation and a mirror as a reflective element. The arrows of FIG. 14a correspond to the interleaver/deinterleaver operating as a deinterleaver.

An optical signal is received through a first port 900. In one embodiment, the first port 900 is a collimator assembly having a GRIN lens to collimate the light. Other types of lenses can also be used, or pre-collimated light can be received. The collimated light is directed to a walk-off crystal isolator 910, which divides the signal into two orthogonally polarized sub-beams. One embodiment of a walk-off crystal isolator that can be used to provide the isolator 910 is described in greater detail below with respect to FIG. 15.

The collimated optical signal is directed to a half wave plate 920 through an opening between reflective prisms 970 and 975. In one embodiment, the half wave plate 920 is oriented with an azimuth angle of 22.5°; however, other azimuth angles can also be used.

The optical signal then passes to a first birefringent element 925. In one embodiment, the first birefringent element 925 is composed of two crystals, together having an optical path length of L, that are selected to provide improved thermal stability over a range of operating temperatures as compared to a single birefringent crystal. In one embodiment, one crystal is a $TiO_2$ crystal and the second crystal is a $YVO_4$ crystal; however, other crystals can also be used. Other birefringent elements can also be used, for example, a single crystal can be used if temperature stability is not important, or other multi-crystal birefringent elements can be used. In one embodiment, the first birefringent element 925 is oriented with a 0° azimuth angle; however, other azimuth angles can also be used.

The optical signal then passes through a half wave plate 930. In one embodiment, the half wave plate 930 is oriented with an azimuth angle of −28.5°. In alternate embodiments, other thicknesses, materials and/or azimuth angles can also be used.

The optical signal then passes through a second birefringent element 935 having an optical path length of 2L. In one embodiment, the second birefringent element 935 is composed of a $TiO_2$ crystal and the second crystal is a $YVO_4$ crystal; however, other sizes can also be used. Other birefringent element arrangements, e.g. a single crystal or other multi-crystal birefringent elements can be used. In one embodiment, the second birefringent element 935 has an azimuth angle of 0°; however, other azimuth angles can also be used in combination with changes with other azimuth angles.

One of the sub-beams passes through half wave plates 940, while the other sub-beam passes through half-wave plate 942. In one embodiment, half wave plate 940 has an azimuth angle of −6.5° and half wave plate 942 has an azimuth angle of 38.5°; however, other azimuth angles can be used. As in the embodiment of FIG. 5a, the wave plates 940 and 942 re-orient the sub-beams so that their states of polarization are the same and properly aligned with a walk-off crystal 945. When the optical signal sub-beams pass through walk-off crystal 945, each sub-beam is divided into a sub-sub-beam comprising the first set of channels, e.g. the odd ITU channels, and a sub-sub-beam comprising the second set of channels, e.g. the even ITU channels. Each of the sub-sub-beams then passes through a quarter wave plate 950 and is reflected by a mirror 960 back through the quarter wave plate 950 a second time resulting in a 90° rotation in their polarization.

The mirror 960 reflects the optical signals back through walk-off crystal 945, birefringent elements 935 and 925 and half wave plates 940, 942, 930 and 920 to reflective prisms 970 and 975. The reflective prism 970 directs the sub-sub-beams of the second set of channels to walk-off crystal 980 for combining and output via a second port 990. Similarly, reflective prism 975 directs the sub-sub-beams of the first set of channels to a walk-off crystal 985 for combining and output via a third port 995.

To operate as an interleaver, two sets of optical signals are input to ports 990 and 995. The two sets of optical signals are combined in a manner that is the reverse of the deinterleaver function described above. The combined (interleaved) optical signal is output through port 900. Thus, the apparatus illustrated in FIG. 9a can operate as an interleaver or as a deinterleaver.

Figure 15:
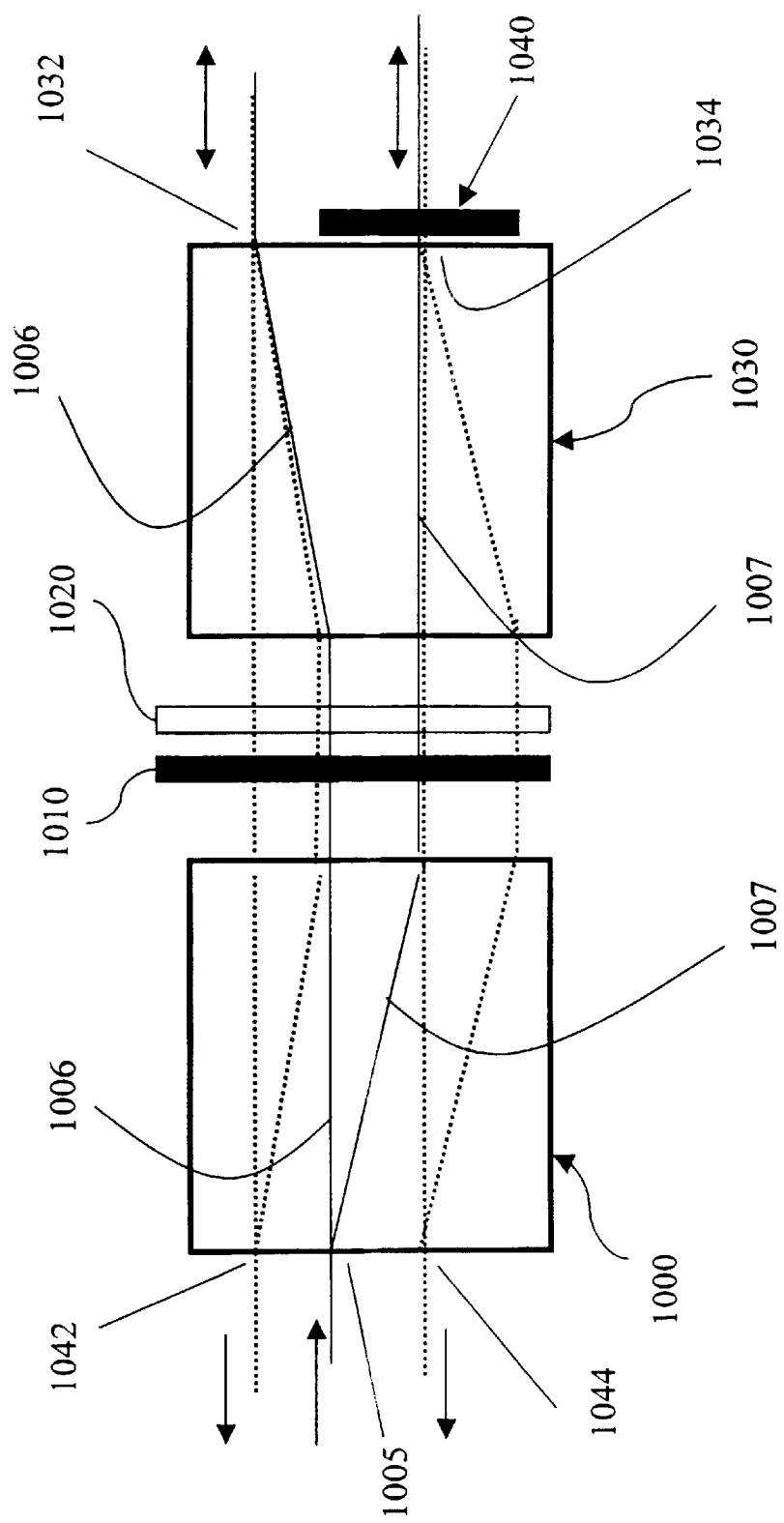
FIG. 15 is a side view of one embodiment of a walk-off crystal-based isolator that can be used with, for example, the interleaver/deinterleaver of FIGS. 14a and 14b.

FIG. 15 is a side view of one embodiment of a walk-off crystal-based isolator that can be used with the interleaver/deinterleaver of FIGS. 14a and 14b. Using the isolator of FIG. 15, reflected signals are prevented from traveling to the original input position. The signal paths illustrated in the isolator of FIG. 15 correspond to isolator 910 of FIGS. 14a and 14b. Isolators 980 and 985 operate in a similar manner.

As an input signal enters a walk-off crystal 1000 via port 1005, the input signal is separated into a first ordinary sub-beam 1006 and a second extraordinary sub-beam 1007. When the signal exits walk-off crystal 1000, the first ordinary sub-beam 1006 and the second extraordinary sub-beam 1007 are separated by a distance that is determined by the physical characteristics of the walk-off crystal 1000.

The first and second sub-beams 1006 and 1007 pass through a non-reciprocal rotator in the form of a Faraday rotator or a garnet 1010, and a reciprocal rotator in the form of a half-wave plate 1020. Preferably, the garnet 1010 and the half-wave plate 1020 each rotate the polarization of the beams by 45°. However, in the forward direction the garnet 1010 and the half-wave plate 1020 rotate the polarization in the same direction resulting in a cumulative 90° rotation, while in the backward direction the garnet 1010 and the half-wave plate 1020 rotate the polarization in the opposite direction resulting in a 0° rotation.

As a result of passage through the garnet 1010 and the half-wave plate 1020 in the forward direction, the first sub-beam 1006 becomes the extraordinary sub-beams, while the second sub-beams 1007 becomes the ordinary sub-beam.

The first and second sub-beam 1006 and 1007 then pass through walk-off crystal 1030, which offsets the sub-beams by a greater amount in a predetermined manner, and are output via ports 1032 and 1034, respectively. In the preferred embodiment, one of the first and the second sub-beams passes through a half wave plate 1040 so that both sub-beams have the same polarization. Alternatively, the half wave plate 1040 can be omitted and the first and second sub-beams can be passed through other optical components, e.g. the components of the interleaver/deinterleaver of FIGS. 14a and 14b. Any reflected light entering ports 1032 or 1034 will be unaffected by the garnet 1010 and the half-wave plate 1020, and pass through the device to exit ports 1042 and 1044, respectively.

For isolators 980 and 985, i.e. when optical signals entering ports 1032 and 1034 are intended to be combined, the garnet 1010 and the half-wave plate 1020 rotate the polarization of the sub-beams in the reverse direction, while unaffecting the polarization of any unwanted light entering port 1005.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. An interleaver/deinterleaver apparatus, having first, second, and third paths, comprising:

a first port capable of transmitting a first optical signal, which comprises a second optical signal comprising at least one wavelength channel from a first subset of wavelength channels and a third optical signal comprising at least one wavelength channel from a second subset of wavelength channels;

a second port capable of transmitting said second optical signal;

a third port capable of transmitting said third optical signal;

a birefringent assembly optically coupled to the first, second and third ports, whereby after a first pass through the birefringent assembly the second signal exits the birefringent assembly with a polarization orthogonal to the polarization of the third signal;

first beam splitting/combining means for separating the first signal input from the first port into the second signal and the third signal, or for combining the second signal input from the second port with the third signal input from the third port into the first signal; and first reflecting means for directing the second and third signals separately back through the birefringent assembly for a second pass along said second and third paths, respectively, for output via the second and third ports, respectively, or for reflecting the second and third signals, which traveled said second and third paths during a first pass, back together through the birefringent assembly for a second pass along said first path to the first port.

2. The apparatus according to claim 1, further comprising first polarization rotating means between the birefringent assembly and the first reflecting means for changing the polarization of the second and third signals, whereby the polarizations of the second and third signals entering the birefringent assembly for the second pass are orthogonal to the polarizations of the second and third signals, respectively, after the first pass.

3. The apparatus according to claim 2, wherein the first beam-splitting/combining means is a walk-off crystal; and
   wherein the first polarization rotating means is positioned between the walk-off crystal and the first reflecting means;
   whereby, when the first signal enters the walk-off crystal, the third signal gets walked off from the second signal, the polarizations of both signals get rotated by the first polarization rotating means, and both signals get directed back through the walk-off crystal by the first reflecting means, wherein the second and third signals diverge farther apart to meet the second and third paths, or whereby, when the second and third signals enter the walk-off crystal the second signal gets walked towards the third signal, the polarizations of both signals get rotated by the first polarization rotating means, and both signals get directed back through the walk-off crystal, wherein the second and third signals converge together along the first path.

4. The apparatus according to claim 2, wherein the first beam splitting/combining means is a walk-off crystal; and
   wherein the first reflecting means comprises two perpendicular reflective surfaces for directing signals exiting the walk-off crystal along the first path to re-enter the walk-off crystal along the second path, and for directing the signals exiting the walk-off crystal along the second path to re-enter the walk-off crystal along the first path.

5. The apparatus according to claim 2, wherein the first beam splitting/combining means is a walk-off crystal; and
   wherein the first reflecting means comprises polarization maintaining (PM) fiber for directing signals exiting the walk-off crystal along the first path to re-enter the walk-off crystal along the second path, and for directing the signals exiting the walk-off crystal along the second path to re-enter the walk-off crystal along the first path.

6. The apparatus according to claim 2, further comprising a lens between the first beam splitting/combining means and the first reflecting means;
   wherein the first beam splitting/combining means is a walk-off crystal; and
   wherein the first reflecting means is a mirror positioned at the focal point of the lens for directing signals exiting the walk-off crystal along the first path to re-enter the walk-off crystal along the second path, and for directing the signals exiting the walk-off crystal along the second path to re-enter the walk-off crystal along the first path.

7. The apparatus according to claim 2, further comprising a prism between the first beam splitting/combining means and the first reflecting means;
   wherein the first beam splitting/combining means is a walk-off crystal; and
   wherein the first reflecting means is a mirror positioned for directing signals exiting the walk-off crystal along the first path to re-enter the walk-off crystal along the second path, and for directing the signals exiting the walk-off crystal along the second path to re-enter the walk-off crystal along the first path.

8. The apparatus according to claim 2, wherein the first beam splitting/combining means is a polarization beam splitting cube; and
   wherein the first reflecting means comprises a first pair of perpendicular reflective surfaces for directing the second signal between the first and second paths, and a second pair of perpendicular reflective surfaces for directing the third signal between the first and third paths.

9. The apparatus according to claim 2, wherein the first reflecting means comprises an etalon.

10. The apparatus according claim 1, wherein the birefringent assembly comprises:
    a first element having an optical path length L; and
    a second element having an optical path length 2L.

11. The apparatus according to claim 10, further comprising second polarization rotating means for adjusting the polarizations of the first, second and third optical signals before entering into the first and second elements of the birefringent assembly.

12. The apparatus according to claim 10, wherein each of the first and second elements of the birefringent assembly is comprised of at least two crystals; and wherein at least two of the crystals are comprised of different materials to enhance thermal stability.

13. The apparatus according to claim 12, wherein one crystal is a $TiO_2$ crystal, and one crystal is an $YVO_4$ crystal.

14. The apparatus according to claim 1, further comprising:
    a lens at each port for collimating incoming signals and focusing outgoing signals;
    second beam splitting/combining means at each port for separating incoming signals into pairs of polarized sub-beams, and/or combining outgoing pairs of polarized sub-beams; and
    sub-beam rotating means for rotating the polarization of one of each pair of sub-beams, whereby in each pair of incoming sub-beams both sub-beams have parallel polarizations for entry into the birefringent assembly and whereby the sub-beams in each pair of outgoing sub-beams are orthogonal for entry into the second beam splitting/combing means.

15. The apparatus according to claim 1, wherein the first subset of channels comprises odd International Telecommunications Union (ITU) channels, and the second subset of channels comprises even ITU channels.

16. The apparatus according to claim 1, further comprising an isolator positioned between each port and the birefringent assembly for preventing light from exiting the first port and entering the second and third ports or for preventing light from entering the first port and exiting the second and third ports.

17. A deinterleaver apparatus comprising:
    a first port for inputting a first optical signal, which comprises a second optical signal comprising at least one wavelength channel from a first subset of wavelength channels and a third optical signal comprising at least one wavelength channel from a second subset of wavelength channels;
    a second port for outputting the second optical signal;
    a third port for outputting the third optical signal;
    a birefringent assembly optically coupled to the first, second and third ports, whereby after a first pass through the birefringent assembly the second signal exits the birefringent assembly with a polarization orthogonal to the polarization of the third signal;
    a beam splitter for separating the first signal into the second signal and the third signal; and
    first reflecting means for directing the second and third signals back through the birefringent assembly for a second pass for output via the second and third ports, respectively.

18. The apparatus according to claim 17, further comprising first polarization rotating means between the birefringent assembly and the first reflecting means for changing the polarization of the second and third signals, whereby the polarizations of the second and third signals entering the birefringent assembly for the second pass are orthogonal to the polarizations of the second and third signals, respectively, after the first pass.

19. The apparatus according claim 17, wherein the birefringent assembly comprises:

a first element having an optical path length L; and a second element having an optical path length 2L;

wherein the first element has a different azimuth angle than the second element, or wherein the first element has substantially the same azimuth angle as the second element and the birefringent assembly further comprises second polarization rotating means positioned between the first and second elements at a predetermined azimuth angle different than the azimuth angle of the first and second elements.

20. An interleaver apparatus comprising:

a first port for outputting a first optical signal, which comprises a second optical signal comprising at least one wavelength channel from a first subset of wavelength channels and a third optical signal comprising at least one wavelength channel from a second subset of wavelength channels;

a second port for inputting the second optical signal;

a third port for inputting the third optical signal;

a birefringent assembly optically coupled to the first, second and third ports, whereby after a first pass through the birefringent assembly the second signal exits the birefringent assembly with a polarization orthogonal to the polarization of the third signal;

a beam combiner for combining the second signal with the third signal forming the first optical signal; and first reflecting means for directing the first signal back through the birefringent assembly for a second pass for output via the first port.

21. The apparatus according to claim 20, further comprising first beam rotating means between the birefringent assembly and the first reflecting means for changing the polarization of the second and third signals, whereby the polarizations of the second and third signals entering the birefringent assembly for the second pass are orthogonal to the polarizations of the second and third signals, respectively, after the first pass.

22. The apparatus according claim 21, wherein the birefringent assembly comprises:

a first element having an optical path length L; and a second element having an optical path length 2L;

wherein the first element has a different azimuth angle than the second element, or wherein the first element has substantially the same azimuth angle as the second element and the birefringent assembly further comprises second polarization rotating means positioned between the first and second elements at a predetermined azimuth angle different than the azimuth angle of the first and second elements.

* * * * *

UNITED STATES PATENT AND TRADEMARK OFFICE
CERTIFICATE OF CORRECTION

PATENT NO. : 6,697,198 B2
DATED : February 24, 2004
INVENTOR(S) : Tai et al.

It is certified that error appears in the above-identified patent and that said Letters Patent is hereby corrected as shown below:

Column 10,
Line 17, "between the x-Doc. axis" should read -- between the x-axis --

Signed and Sealed this

Sixth Day of July, 2004

JON W. DUDAS
*Acting Director of the United States Patent and Trademark Office*